(12) United States Patent
Schmidt et al.

(10) Patent No.: US 7,284,268 B2
(45) Date of Patent: Oct. 16, 2007

(54) SYSTEM AND METHOD FOR A ROUTING DEVICE TO SECURELY SHARE NETWORK DATA WITH A HOST UTILIZING A HARDWARE FIREWALL

(75) Inventors: Jeffrey C. Schmidt, Orlando, FL (US); Philip A. Gutierrez, Houston, TX (US); Charles R. Barker, Jr., Orlando, FL (US)

(73) Assignee: Meshnetworks, Inc., Maitland, FL (US)

( * ) Notice: Subject to any disclaimer, the term of this patent is extended or adjusted under 35 U.S.C. 154(b) by 536 days.

(21) Appl. No.: 10/255,608

(22) Filed: Sep. 27, 2002

(65) Prior Publication Data

US 2004/0039941 A1 Feb. 26, 2004

Related U.S. Application Data

(60) Provisional application No. 60/378,055, filed on May 16, 2002.

(51) Int. Cl.
*H04L 29/00* (2006.01)
*H04L 29/02* (2006.01)

(52) U.S. Cl. .............. 726/11; 726/3; 726/13; 726/14; 726/15; 713/153; 713/154; 709/238; 709/239; 709/240; 709/241; 709/242; 709/243; 709/244

(58) Field of Classification Search ........... 713/201, 713/200
See application file for complete search history.

(56) References Cited

U.S. PATENT DOCUMENTS

| 4,494,192 A | 1/1985 | Lew et al. ............... 364/200 |
|---|---|---|
| 4,617,656 A | 10/1986 | Kobayashi et al. ........... 370/74 |
| 4,736,371 A | 4/1988 | Tejima et al. ............... 370/95 |
| 4,742,357 A | 5/1988 | Rackley ....................... 342/457 |

(Continued)

FOREIGN PATENT DOCUMENTS

CA  2132180  3/1996

(Continued)

OTHER PUBLICATIONS

Wong et al., "Soft Handoffs in CDMA Mobile Systems", Dec. 1997, IEEE Personal Communications.

(Continued)

*Primary Examiner*—Syed A. Zia
(74) *Attorney, Agent, or Firm*—Randi L. Karpinia

(57) ABSTRACT

A system and method for providing the ability to selectively share data in a network routing device with an associated host. The system and method employs a hardware firewall in the routing device which restricts the host such that it can only access areas in shared memory which contains data destined for the host. The routing device CPU notifies the host of pending data and the location of that data in the shared memory. The hardware firewall is also notified of the location in shared memory which the host may access. When the host attempts to read the data, the firewall ensures that only the stated memory area or areas are accessed by the host. Once the data has been read by the host, the firewall is notified to cancel the host's ability to access the shared memory until such time as a new packet destined for the host arrives in the routing device.

21 Claims, 3 Drawing Sheets

U.S. PATENT DOCUMENTS

| | | |
|---|---|---|
| 4,747,130 A | 5/1988 | Ho .................... 379/269 |
| 4,910,521 A | 3/1990 | Mellon ................ 342/45 |
| 5,034,961 A | 7/1991 | Adams ................ 375/130 |
| 5,068,916 A | 11/1991 | Harrison et al. ........ 455/39 |
| 5,231,634 A | 7/1993 | Giles et al. ........... 370/95.1 |
| 5,233,604 A | 8/1993 | Ahmadi et al. ........ 370/60 |
| 5,241,542 A | 8/1993 | Natarajan et al. ...... 370/95.3 |
| 5,317,566 A | 5/1994 | Joshi ................. 370/60 |
| 5,392,450 A | 2/1995 | Nossen ............... 455/12.1 |
| 5,412,654 A | 5/1995 | Perkins .............. 370/94.1 |
| 5,424,747 A | 6/1995 | Chazelas et al. ...... 342/70 |
| 5,502,722 A | 3/1996 | Fulghum ............. 370/69.1 |
| 5,517,491 A | 5/1996 | Nanni et al. ......... 370/29 |
| 5,555,425 A | 9/1996 | Zeller et al. ......... 395/800 |
| 5,555,540 A | 9/1996 | Radke ............... 370/16.1 |
| 5,572,528 A | 11/1996 | Shuen ............... 370/85.13 |
| 5,615,212 A | 3/1997 | Ruszczyk et al. ..... 370/433 |
| 5,618,045 A | 4/1997 | Kagan et al. ......... 463/40 |
| 5,621,732 A | 4/1997 | Osawa ............... 370/79 |
| 5,623,495 A | 4/1997 | Eng et al. ........... 370/397 |
| 5,627,976 A | 5/1997 | McFarland et al. .... 395/308 |
| 5,631,897 A | 5/1997 | Pacheco et al. ...... 370/237 |
| 5,638,448 A | 6/1997 | Nguyen |
| 5,644,576 A | 7/1997 | Bauchot et al. ....... 370/437 |
| 5,652,751 A | 7/1997 | Sharony ............. 370/227 |
| 5,680,392 A | 10/1997 | Semaan .............. 370/261 |
| 5,684,794 A | 11/1997 | Lopez et al. ......... 370/337 |
| 5,687,194 A | 11/1997 | Paneth et al. ........ 375/283 |
| 5,696,903 A | 12/1997 | Mahany .............. 395/200.58 |
| 5,701,294 A | 12/1997 | Ward et al. .......... 370/252 |
| 5,706,428 A | 1/1998 | Boer et al. .......... 395/200 |
| 5,717,689 A | 2/1998 | Ayanoglu ............ 370/349 |
| 5,727,142 A * | 3/1998 | Chen ................. 714/2 |
| 5,745,483 A | 4/1998 | Nakagawa et al. ..... 370/335 |
| 5,774,876 A | 6/1998 | Wooley et al. ........ 705/28 |
| 5,781,540 A | 7/1998 | Malcolm et al. ....... 370/321 |
| 5,787,080 A | 7/1998 | Hulyalkar et al. ..... 370/348 |
| 5,794,154 A | 8/1998 | Bar-On et al. ........ 455/509 |
| 5,796,732 A | 8/1998 | Mazzola et al. ....... 370/362 |
| 5,796,741 A | 8/1998 | Saito et al. .......... 370/439 |
| 5,805,593 A | 9/1998 | Busche .............. 370/396 |
| 5,805,842 A | 9/1998 | Nagaraj et al. ....... 395/306 |
| 5,805,977 A | 9/1998 | Hill et al. ........... 455/31.3 |
| 5,809,518 A | 9/1998 | Lee .................. 711/115 |
| 5,822,309 A | 10/1998 | Ayanoglu et al. ..... 370/315 |
| 5,844,905 A | 12/1998 | McKay et al. ........ 370/443 |
| 5,845,097 A | 12/1998 | Kang et al. .......... 395/297 |
| 5,857,084 A | 1/1999 | Klein ................ 395/309 |
| 5,870,350 A | 2/1999 | Bertin et al. ......... 365/233 |
| 5,877,724 A | 3/1999 | Davis ................ 342/357 |
| 5,881,095 A | 3/1999 | Cadd ................ 375/202 |
| 5,881,372 A | 3/1999 | Kruys ............... 455/113 |
| 5,886,992 A | 3/1999 | Raatikainen et al. ... 370/410 |
| 5,896,561 A | 4/1999 | Schrader et al. ...... 455/67.1 |
| 5,903,559 A | 5/1999 | Acharya et al. ....... 370/355 |
| 5,909,651 A | 6/1999 | Chander et al. ...... 455/466 |
| 5,936,953 A | 8/1999 | Simmons ............ 370/364 |
| 5,943,322 A | 8/1999 | Mayor et al. ........ 370/280 |
| 5,987,011 A | 11/1999 | Toh ................. 370/331 |
| 5,987,033 A | 11/1999 | Boer et al. .......... 370/445 |
| 5,991,279 A | 11/1999 | Haugli et al. ........ 370/311 |
| 6,028,853 A | 2/2000 | Haartsen ............ 370/338 |
| 6,029,217 A | 2/2000 | Arimilli et al. ....... 710/107 |
| 6,034,542 A | 3/2000 | Ridgeway ........... 326/39 |
| 6,044,062 A | 3/2000 | Brownrigg et al. .... 370/238 |
| 6,047,330 A | 4/2000 | Stracke, Jr. ......... 709/238 |
| 6,052,594 A | 4/2000 | Chuang et al. ....... 455/450 |
| 6,052,752 A | 4/2000 | Kwon ............... 710/126 |
| 6,064,626 A | 5/2000 | Stevens ............. 365/233 |
| 6,067,291 A | 5/2000 | Kamerman et al. .... 370/338 |
| 6,073,005 A | 6/2000 | Raith et al. .......... 455/404 |
| 6,078,566 A | 6/2000 | Kikinis ............. 370/286 |
| 6,104,712 A | 8/2000 | Robert et al. ........ 370/389 |
| 6,108,738 A | 8/2000 | Chambers et al. ..... 710/113 |
| 6,115,580 A | 9/2000 | Chuprun et al. ...... 455/1 |
| 6,122,690 A | 9/2000 | Nannetti et al. ...... 710/102 |
| 6,130,881 A | 10/2000 | Stiller et al. ........ 370/238 |
| 6,132,306 A | 10/2000 | Trompower .......... 453/11.1 |
| 6,147,975 A | 11/2000 | Bowman-Amuah ..... 370/252 |
| 6,163,699 A | 12/2000 | Naor et al. .......... 455/453 |
| 6,178,337 B1 | 1/2001 | Spartz et al. ........ 455/561 |
| 6,192,053 B1 | 2/2001 | Angelico et al. ..... 370/448 |
| 6,192,230 B1 | 2/2001 | Van Bokhorst et al. . 455/343 |
| 6,208,870 B1 | 3/2001 | Lorello et al. ....... 455/466 |
| 6,223,240 B1 | 4/2001 | Odenwald et al. .... 710/129 |
| 6,240,294 B1 | 5/2001 | Hamilton et al. ..... 455/456 |
| 6,246,875 B1 | 6/2001 | Seazholtz et al. ..... 455/432 |
| 6,249,516 B1 | 6/2001 | Brownrigg et al. .... 370/338 |
| 6,275,707 B1 | 8/2001 | Reed et al. ......... 455/456 |
| 6,285,892 B1 | 9/2001 | Hulyalkar .......... 455/574 |
| 6,304,556 B1 | 10/2001 | Haas ................ 370/254 |
| 6,304,973 B1 * | 10/2001 | Williams ........... 713/201 |
| 6,321,337 B1 | 11/2001 | Reshef et al. |
| 6,327,300 B1 | 12/2001 | Souissi et al. ....... 375/219 |
| 6,341,309 B1 * | 1/2002 | Vaid et al. .......... 709/223 |
| 6,349,091 B1 | 2/2002 | Li .................. 370/238 |
| 6,349,210 B1 | 2/2002 | Li .................. 455/450 |
| 6,363,065 B1 | 3/2002 | Thornton et al. ..... 370/352 |
| 6,584,508 B1 * | 6/2003 | Epstein et al. ....... 709/229 |
| 6,754,188 B1 * | 6/2004 | Garahi et al. ....... 370/328 |
| 6,925,069 B2 * | 8/2005 | Koos et al. ......... 370/334 |
| 7,072,650 B2 * | 7/2006 | Stanforth ........... 455/426.2 |
| 2001/0053699 A1 | 12/2001 | McCrady et al. ..... 455/513 |
| 2002/0078377 A1 * | 6/2002 | Chang et al. ....... 713/201 |
| 2002/0120755 A1 * | 8/2002 | Gomes et al. ....... 709/229 |

FOREIGN PATENT DOCUMENTS

| | | |
|---|---|---|
| EP | 0513841 A2 | 11/1992 |
| EP | 0627827 A2 | 12/1994 |
| EP | 0924890 A2 | 6/1999 |
| FR | 2683326 | 7/1993 |
| WO | WO9608884 | 3/1996 |
| WO | WO9724005 | 7/1997 |
| WO | WO9839936 | 9/1998 |
| WO | WO9912302 | 3/1999 |
| WO | WO 0034932 | 6/2000 |
| WO | WO 0110154 | 2/2001 |
| WO | WO 0133770 | 5/2001 |
| WO | WO 0135567 | 5/2001 |
| WO | WO 0137481 | 5/2001 |
| WO | WO 0137482 | 5/2001 |
| WO | WO 0137483 | 5/2001 |
| WO | WO 0235253 | 5/2002 |

OTHER PUBLICATIONS

Wong et al., "A Pattern Recognition System for Handoff Algorithms", Jul. 2000, IEEE Journal on Selected Areas in Communications, vol. 18, No. 7.

Andras G. Valko, "Cellular IP: A New Approach to Internet Host Mobility", Jan. 1999, ACM Computer Communication Review.

Richard North, Dale Bryan and Dennis Baker, "Wireless Networked Radios: Comparison of Military, Commercial, and R&D Protocols", Feb. 28-Mar. 3, 1999, 2nd Annual UCSD Conference on Wireless Communications, San Diego CA.

Benjamin B. Peterson, Chris Kmiecik, Richard Hartnett, Patrick M. Thompson, Jose Mendoza and Hung Nguyen, "Spread Spectrum Indoor Geolocation", Aug. 1998, Navigation: Journal of the Institute of Navigation, vol. 45, No. 2, summer 1998.

Josh Broch, David A. Maltz, David B. Johnson, Yih-Chun Hu and Jorjeta Jetcheva, "A Performance Comparison of Multi-Hop Wireless Ad Hoc Network Routing Protocols", Oct. 25-30, 1998, Proceedings of the 4th Annual ACM/IEEE International Conference on Mobile Computing and Networking.

C. David Young, "USAP: A Unifying Dynamic Distributed Multichannel TDMA Slot Assignment Protocol", 1996.

Chip Elliott and Bob Heile, "Self-Organizing, Sef-Healing Wireless Networks", 2000 IEEE.

J.J. Garcia-Luna-Aceves and Asimakis Tzamaloukas, "Reversing the Collision-Avoidance Handshake in Wireless Networks", 1999.

J.J. Garcia-Luna-Aceves and Marcelo Spohn, "Transmission-Efficient Routing in Wireless Networks Using Link-State Information", 2001.

J.J. Garcia-Luna-Aceves and Ewerton L. Madruga, "The Core-Assisted Mesh Protocol", Aug. 1999, IEEE Journal on Selected Areas in Communications, vol. 17, No. 8.

Ad Kamerman and Guido Aben, "Net Throughput with IEEE 802.11 Wireless LANs", IEEE, 2000.

J.R. McChesney and R.J. Saulitis, "Optimization of an Adaptive Link Control Protocol for Multimedia Packet Radio Networks", MILCOM, 1999.

Ram Ramanathan and Regina Rosales-Hain, "Topology Control of Multihop Wireless Networks using Transmit Power Adjustment", IEEE, 2000.

Ram Ramanathan and Martha E. Steenstrup, "Hierarchically-Organized, Multihop Mobile Wireless Networks for Quality-of-Service Support", 1998.

Martha E. Steenstrup, "Dynamic Multipoint Virtual Circuits for Multimedia Traffic in Multihop Mobile Wireless Networks", 1999.

Zhenyu Tang and J.J. Garcia-Luna-Aceves, "Collision-Avoidance Transmission Scheduling for Ad-Hoc Networks", IEEE ICC, 2000.

George Vardakas and Wendell Kishaba, "QoS Networking With Adaptive Link Control and Tactical Multi-Channel Software Radios", IEEE MILCOM, 1999.

* cited by examiner

SYSTEM AND METHOD FOR A ROUTING DEVICE TO SECURELY SHARE NETWORK DATA WITH A HOST UTILIZING A HARDWARE FIREWALL

This application claims the benefit of U.S. Provisional Patent Application No. 60/378,055 entitled "A System And Method For A Routing Device To Securely Share Network Data With A Host Utilizing A Hardware Firewall", filed May 16, 2002, the entire contents of which being incorporated herein by reference.

BACKGROUND OF THE INVENTION

1. Field of the Invention

The present invention relates to a system and method for selectively sharing data contained in a network routing device with an associated host device. More particularly, the invention relates to a system and method for enabling routing device hardware to provide selective access by a host device to shared memory within the routing device, thus restricting the host's ability to access data not intended for use by the host.

2. Description of the Related Art

In recent years, a type of mobile communications network known as an "ad-hoc" network has been developed. In this type of network, each user terminal is capable of operating as a base station or router for other mobile nodes, thus eliminating the need for a fixed infrastructure of base stations. Accordingly, data packets being sent from a source mobile node to a destination mobile node are typically routed through a number of intermediate mobile nodes before reaching the destination node.

More sophisticated ad-hoc networks are also being developed which, in addition to enabling mobile nodes to communicate with each other as in a conventional ad-hoc network, further enable the mobile nodes to access a fixed network and communicate with other types of user terminals, such as those on the public switched telephone network (PSTN) and on other networks, such as the Internet. Details of these types of ad-hoc networks are described in U.S. Pat. No. 7,072,650 entitled "Ad Hoc Peer-to-Peer Mobile Radio Access System Interfaced to the PSTN and Cellular Networks", issued on Jul. 4, 2006, U.S. Pat. No. 6,807,165 entitled "Time Division Protocol for an Ad-Hoc, Peer-to-Peer Radio Network Having Coordinating Channel Access to Shared Parallel Data Channels with Separate Reservation Channel", issued on Oct, 19, 2004, and in U.S. Pat. No. 6,873,839 entitled "Prioritized-Routing for an Ad-Hoc, Peer-to-Peer, Mobile Radio Access System", issued on Mar. 29, 2005, the entire content of each being incorporated herein by reference.

Generally, all nodes in a wireless ad-hoc peer-to-peer network provide similar core services and functionality, although their specific functionality can depend on their intended purposes, such as use as an access point, fixed router or mobile terminal. Although each node can provide similar services, the workload is typically distributed across many nodes rather than centralized at a single location in the peer-to-peer network. Therefore peer-to-peer networks distinguish themselves from infrastructure networks where one or more nodes offer a superset of the functionality of the rest of the network. Infrastructure nodes in these networks typically can handle Dynamic Host Configuration Protocol (DHCP), Address Resolution Protocol (ARP), as well as other services that depend on broadcast traffic. Dynamic Host Configuration Protocol is defined by IETF RFC 2131 and 2132, which are incorporated herein by reference, and is used by a client node to automatically obtain network settings from a central server. These network settings include the client's IP address, the address of Domain Name Servers (DNS), the IP address of default gateways, and many other network settings. Address Resolution Protocol is defined by STD 0037 and RFC 0826, which are incorporated herein by reference, and is used by a network node to map IP addresses to MAC addresses so IP traffic can be delivered to specific hardware. Such infrastructure nodes are normally discovered by broadcast traffic advertisements from their client nodes in a network.

As can be appreciated by one skilled in the art, traffic in such networks includes direct and indirect communications, in which nodes can be used as routers while both stationary or mobile. A mobile node typically includes a host, such as a personal computer (PC) or personal digital assistant (PDA), with an attached transceiver and a controller. A mobile node can further include a network interface device coupled to a host device, which allows the host device communication access with the network. The transceiver of the mobile node receives data packets, such as voice, data or multimedia data packets, from other nodes, and the controller determines which data packets are intended for it's associated host. If a data packet is intended for the associated host, the host is notified to retrieve the packet. If the packet is not intended for the associated host, the controller determines the next node to which the data packet should be sent based on routing table or similar information, and controls the transceiver of the mobile node to send the data packet to the next node.

In traditional networks where the user nodes do not re-route traffic, the network interface device will inspect an incoming packet header and store packet data only if it is destined for the host device associated with the network interface device. Therefore, the host never has the opportunity to examine data which is intended for other devices. However, once a device is required to reroute packets to a destination device other than the associated host as in an ad-hoc network, all packets must be captured and evaluated by the routing device. Once a packet is captured by a network interface device, it then may become susceptible to unauthorized access by the associated host device.

However, the ability to selectively share data between a routing device and an associated host, such as a personal computer, is necessary in a wireless ad-hoc network. This allows a subscriber to have an access point for extracting or sending data through the network. Because the vast majority of routing resources or nodes that exist in a multihopping, ad-hoc network each route data that is not intended for its associated host, precautions must be taken to insure that only data intended for the node's associated host can be extracted from the routing device in the node. However, many of the methods for achieving this are either inefficient in their ability to route data, require use of multiple memories, or are insecure.

Accordingly, a need exists for a system and method for protecting data traveling through a network by ensuring that a host device may only access data that was intended for access by that host device.

SUMMARY OF THE INVENTION

An object of the present invention is to provide a system and method for restricting a host device from accessing network data which is not intended for host access.

Another object of the present invention is to provide a hardware implemented firewall internal to a routing device in a communication network, such as an ad-hoc network, to prevent unauthorized access by a host device to data stored in shared memory on the routing device.

A further object of the present invention is to restrict host access to the shared memory such that there may be no access, access to a single area, or access to multiple areas in the shared memory when required.

Another objective of the present invention is to disallow host access to the shared memory once the host has retrieved the data it is permitted to retrieve.

These and other objects are substantially achieved by providing a system and method to securely share data between a routing device and an associated host by utilizing a hardware firewall which restricts the host's access to a shared memory area on the routing device. The system and method employs a hardware firewall in the routing device which restricts the host such that it can only access areas in shared memory which contains data destined for the host. The routing device CPU notifies the host of pending data and the location of that data in the shared memory. The hardware firewall is also notified of the location in shared memory which the host may access. When the host attempts to read the data, the firewall ensures that only the stated memory area or areas are accessed by the host. Once the data has been read by the host, the firewall is notified to cancel the host's ability to access the shared memory until such time as a new packet destined for the host arrives in the routing device.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

Figure 1:
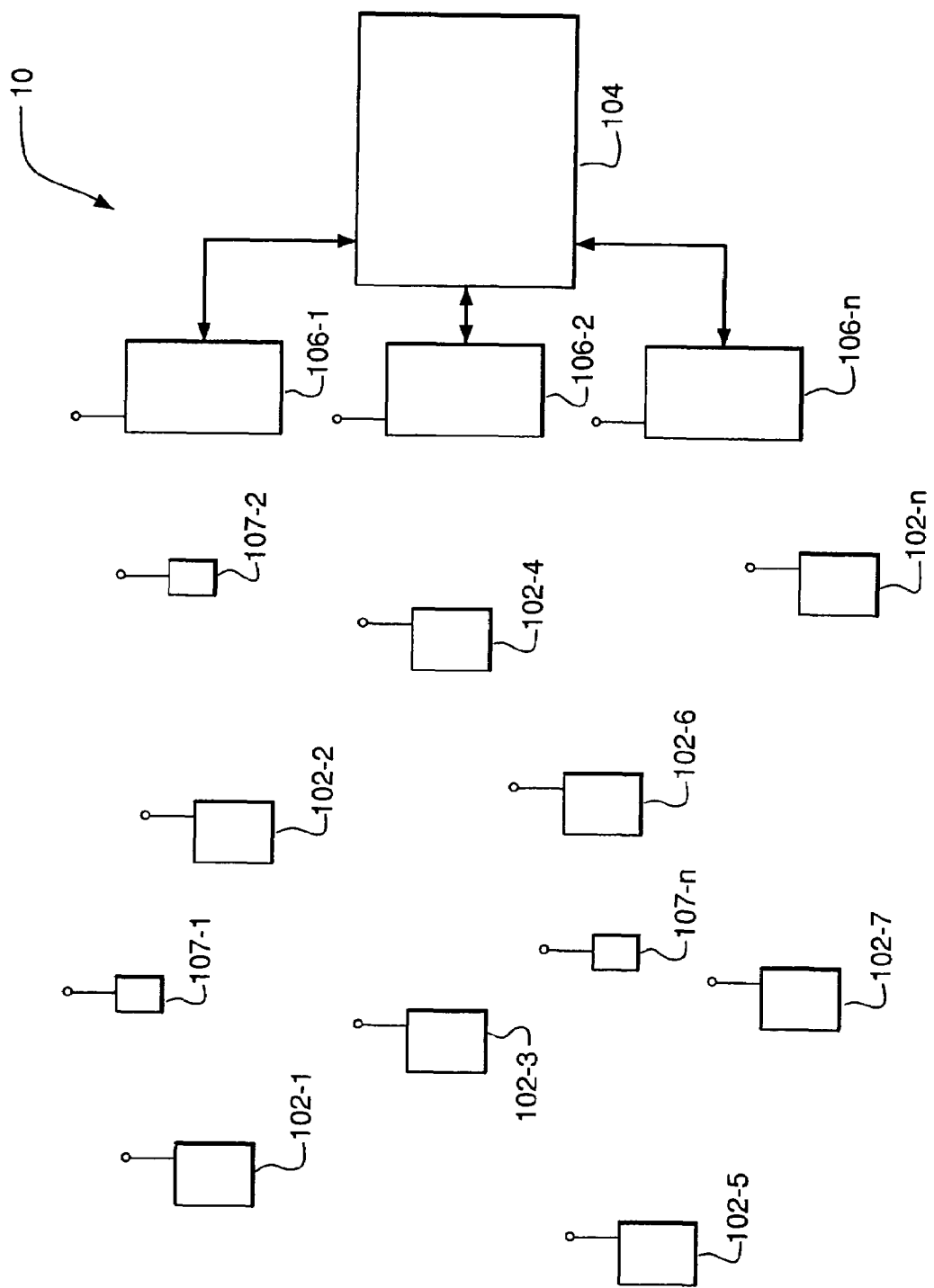
FIG. 1 is a conceptual block diagram of an example of an ad-hoc wireless communications network including a plurality of nodes employing an embodiment of the present invention.

FIG. 1 is a block diagram illustrating an example of an ad-hoc packet-switched wireless communications network 10 employing an embodiment of the present invention. Specifically, the network 10 includes a plurality of mobile wireless user terminals 102-1 through 102-n (referred to generally as nodes or mobile nodes 102), and a fixed network 104 having a plurality of access points 106-1, 106-2, . . . 106-n (referred to generally as nodes or access points 106), for providing the nodes 102 with access to the fixed network 104. The fixed network 104 includes, for example, a core local access network (LAN), and a plurality of servers and gateway routers, to provide the nodes 102 with access to other networks, such as other ad-hoc networks, the public switched telephone network (PSTN) and the Internet.

The network 10 further includes a plurality of fixed routers 107-1 through 107-n (referred to generally as nodes or fixed routers 107) for routing data packets between other nodes 102, 106 or 107. As can be appreciated by one skilled in the art, the nodes 102, 106 and 107 are capable of communicating directly with each other, or via one or more other nodes operating as routers for data packets being sent between nodes, as described in U.S. Pat. No. 5,943,322 to Mayor and in U.S. Pat. Nos. 7,072,650 and 6,807,165, referenced above. The data packets can include voice, data or multimedia.

Figure 2:
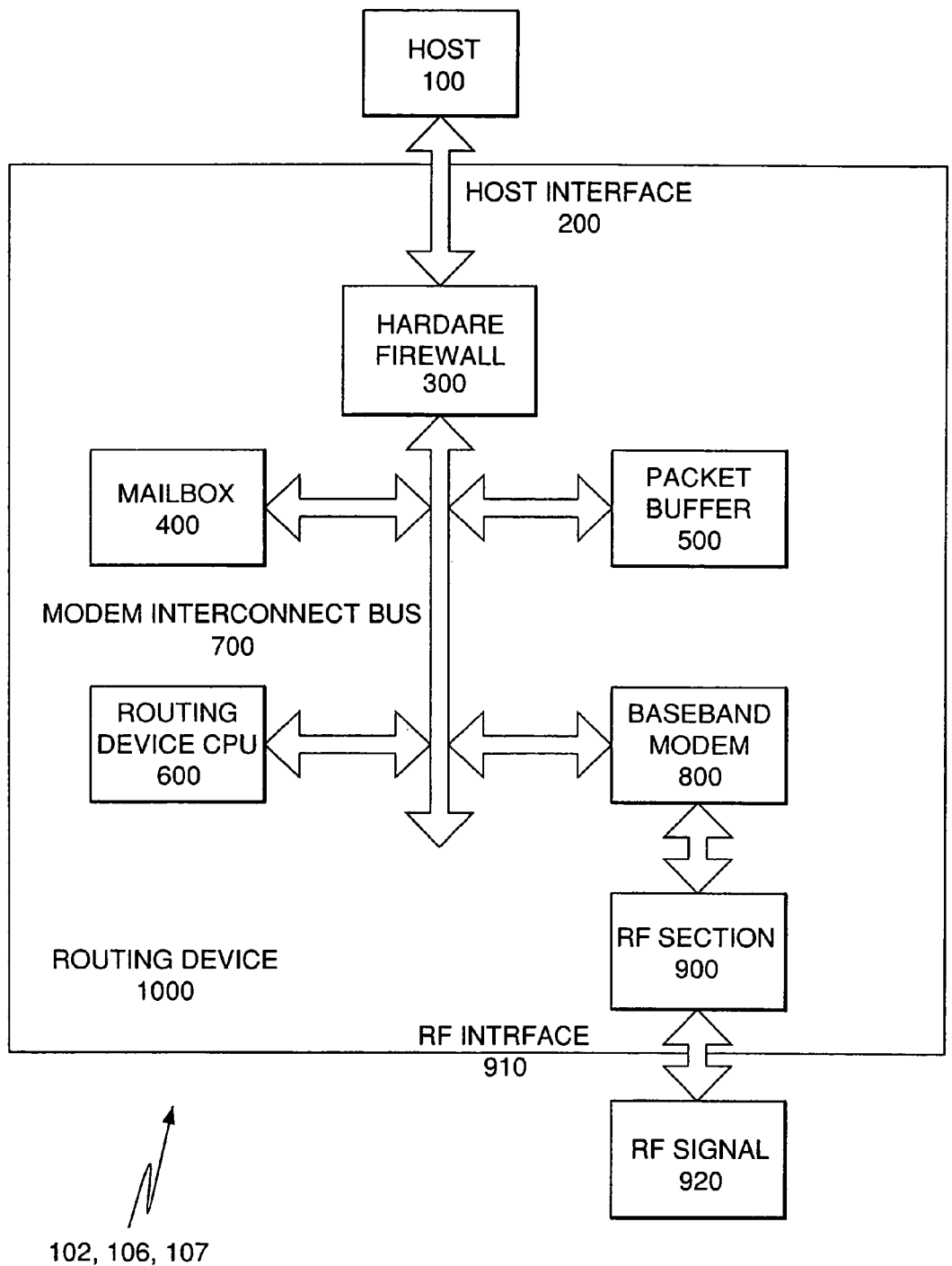
FIG. 2 is a conceptual block diagram of an example of components of a wireless node as shown in FIG. 1, including firewall hardware elements in accordance with an embodiment of the present invention.

Specifically, as shown in FIG. 2, any of the nodes 102, 106 or 107 and, in particular, each mobile node 102, includes a routing device 1000 and a host device 100. The host 100 is typically a personal computer (PC) or personal digital assistant (PDA), used by a subscriber to gain access to the network 10 shown in FIG. 1, but can be any number of devices, such as a notebook computer terminal, mobile telephone unit, mobile data unit, or any other suitable device. In this example, routing device 1000 includes two external interfaces. The host interface 200 allows a host device 100 and the routing device 1000 to communicate. The radio frequency (RF) interface 910 allows the RF signal 920 to be either received by or transmitted from the routing device 1000. The embodiment shown in FIG. 2 utilizes an RF signal as the medium in the physical layer, as defined in the OSI model, ISO/IEC 7498-1 (1994), the entire contents being incorporated herein by reference. However, any type of medium, such as infrared, fiber optics, or wire, could be used by the physical layer to send the data packets between the nodes 102, 106 and 107.

Figure 3:
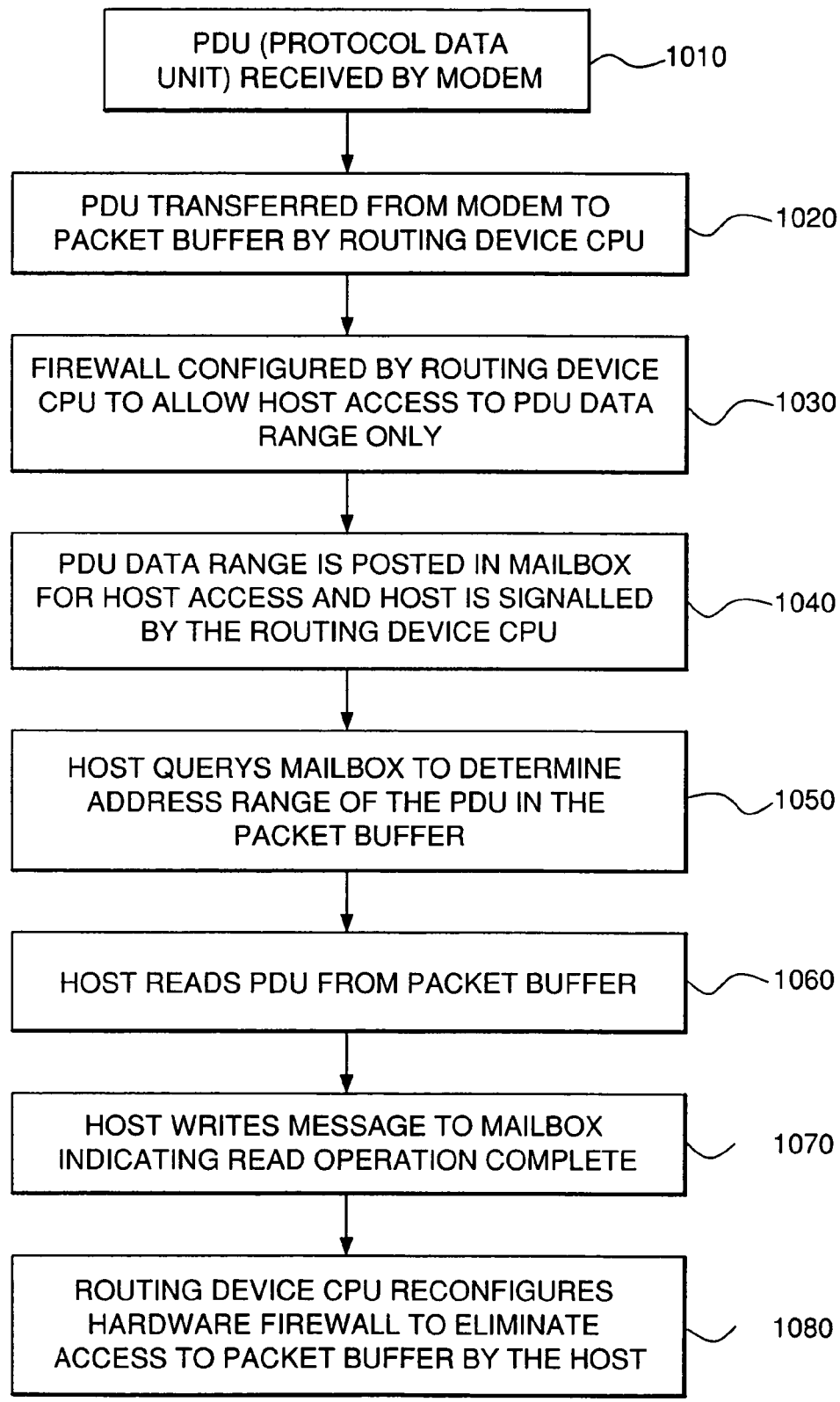
FIG. 3 is a flow diagram illustrating an example of the logic of a secure data transaction from the routing device of a node as shown in FIGS. 1 and 2 to the host associated with that routing device in accordance with an embodiment of the present invention.

As further shown in FIG. 3, the routing device 1000 of FIG. 3 includes an internal hardware firewall 300, a mailbox 400, a packet buffer 500, a routing device CPU 600, a modem interconnect bus 700, a baseband modem 800 and an RF section 900. The hardware firewall 300 provides selective read and write access to the packet buffer 500 by the host 100. The configuration and control of the hardware firewall 300 is controlled solely by the routing device CPU 600 in this example.

The mailbox 400 of the routing device 1000 in FIG. 3 provides a common set of registers, shared by the host 100 and routing device CPU 600, which are used to exchange small amounts of data and messages. The packet buffer 500 of the routing device 1000 is a memory device also shared by the routing device CPU 600 and the host 100. The routing device CPU 600 includes a processor capable of executing instructions that control the functions of the modem 800, execute routing algorithms, and perform data movement transactions. The CPU 600 and modem 800 also include the appropriate hardware and software to provide IP, ARP, admission control (AC), traffic control (TC), ad-hoc routing (AHR), logic link control (LLC) and media access control (MAC). The transceiver 110 further includes the appropriate hardware and software for IAP association (IA), UDP, simple network management protocol (SNMP), data link (DL) protocol and dynamic host configuration protocol (DHCP) relaying.

The modem interconnect bus 700 of the routing device 1000 in FIG. 3 is used to interconnect the elements of the modem transceiver. Further details of an example of this type of bus are described in U.S. patent application publication No. 20030043790A1 entitled "Multi-Master Bus Architecture for System-On-Chip Designs" filed on Sep. 6, 2001, the entire content being incorporated herein by reference.

The baseband modem 800 of the routing device 1000 in FIG. 3 modulates the outgoing signals to analog format, and demodulates incoming signals to digital format. The RF section 900 upconverts the modulated baseband signal for RF propagation and downconverts the received RF signal for demodulation by the modem 800, and the RF signal 920 provides the physical layer for communicating between routing devices in the nodes 102, 106 and 107.

In FIG. 3, a flow diagram illustrating an example of the logic of a secure data transaction from the routing device 1000 to the host 100 in accordance with an embodiment of the present invention is shown. In step 1010 shown in FIG.

3, data received at the routing device 1000 is transferred from the physical layer, such as an RF signal sent from another node 102, 106 or 107, to the modem 800 where it is converted to digital format. In the embodiment shown in FIG. 3, an RF signal is used as the medium in the physical layer, however as pointed out above, any type of medium could be used by the physical layer, such as infrared, fiber optics, or wire.

In step 1020, the digital format packet is transferred from the baseband modem 800 to the packet buffer 500 by the routing device CPU 600. In step 1030, the routing device CPU 600 determines if the local host 100 needs access to the data, and then notifies the hardware firewall 300 of the specific packet buffer 500 area which the host 100 is to be allowed access. If the packet is not destined for the associated host 100, the host is not notified of the new packet.

In step 1040, the routing device CPU 600 places the address range of the data to be delivered to the host 100 in the mailbox 400 and then signals the host 100 to retrieve the message from the mailbox. In step 1050, the host 100 reads the message in the mailbox 400 and discovers what part of the packet buffer 500 it is to access, and in step 1060, the host 100 reads the data in the designated area of the packet buffer 500.

The hardware firewall 300 ensures that only the designated area is accessed by the host 100. In Block 1070 the host 100 writes a message to the mailbox 400 indicating that the read action has been completed and signals the routing device CPU 600. Finally, in Block 1080, the routing device CPU 600 notifies the hardware firewall 300 that the host 100 no longer has access to the designated area of the packet buffer 500.

The embodiment of the present invention described provides a single memory resource that is utilized by the routing device and the associated host. Since each routing device in the network must temporarily store data in a memory for either access by the host or retransmission to another routing resource or destination, a common memory is used. The use of a shared memory resource, such as a "packet buffer" 500, has the advantage of reducing the number of separate memories required to store data and reduces the number of transactions that a processor must perform in order to transfer data to it's intended destination.

The embodiment described above provides selective access by the host to the shared memory or "packet buffer" 500 on the routing device 1000. The selective access by the host is implemented solely by hardware in the routing device such that no security protocol or encryption is required to protect data not intended to be accessed by the host. Host access to the packet buffer can be configured to allow multiple windows of different memory ranges, or alternatively, host access to the packet buffer can be eliminated entirely. Additionally, the embodiment includes a mechanism to communicate to the host which areas it is allowed to access in the packet buffer.

Furthermore, data movement is minimized between memories because the host 100 and routing device CPU 600 have direct access to the shared packet buffer 500. By securely using a single shared memory, cost is minimized and data transfer efficiency is maximized in the routing device while maintaining the integrity of the network data. Furthermore, by implementing the firewall 300 in the routing device hardware, it is not susceptible to hacking from the host computer 100.

Although network routers and bridges reroute network traffic, they typically do not have associated hosts. While security issue addressed by the embodiment of the present invention described above could potentially apply to any communications device with an associated host, they specifically apply to devices which support multi-hopping. The embodiment of the present invention described above restricts a host from reading data not intended for it, however it does not deal with restrictions on the ability of the host to write data to the routing device.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined.

What is claimed is:

1. A node for use in a wireless ad-hoc communications network, said node comprising:
   a host device for processing one or more data packets intended for said node; and
   a routing device for routing one or more other data packets to and from one or more other nodes in said wireless ad-hoc network, said routing device comprising:
   a memory for storing said one or more data packets and said one or more other data packets,
   an internal hardware firewall, adapted to provide access by said host device to said one or more data packets stored in said memory, and further adapted to prevent access by said host device to said one or more other data packets, and
   a controller, adapted to configure said internal hardware firewall to provide or prevent said access,
   wherein said memory comprises:
   a register mailbox, and
   a packet buffer which has a plurality of addresses, and
   wherein said memory is adapted to provide a common set of registers to said host device and said controller.

2. A node as claimed in claim 1, further comprising:
   a modem, adapted to modulate an outgoing signal into an analog format, and demodulate an incoming signal into a digital format packet; and
   wherein said controller is further adapted to direct modem control functions to demodulate an incoming signal into a digital format packet.

3. A node as claimed in claim 1, wherein:
   said controller is further adapted to retrieve a completion reply from said host device and in response, to configure said internal hardware firewall to prohibit said host device to access said register mailbox and said packet buffer.

4. A node as claimed in claim 2, wherein:
   said controller is further adapted to direct routing functions to transfer a digital format packet from said modem to an address range of said packet buffer.

5. A node as claimed in claim 2, wherein:
   said controller is further adapted to determine if said host device requires access to said incoming signal digital format packet and in response, to configure said internal hardware firewall to allow said host device access to said register mailbox via a host interface.

6. A node as claimed in claim 2, wherein:
   said controller is further adapted to determine an address range in said packet buffer which contains said digital format packet and to place a message containing said address range in said register mailbox, and to signal said host device to access said register mailbox to retrieve said message.

7. A node as claimed in claim 4, wherein:
said controller is further adapted to configure said internal hardware firewall to allow said host device to access said address range of said packet buffer.

8. A method of managing access to data stored within a node in a wireless ad-hoc network, wherein said node comprises a host device and a routing device, wherein said routing device includes a memory, an internal hardware firewall, and a controller, said method comprising:
storing one or more data packets intended for said node within said memory;
storing one or more other data packets intended for one or more other nodes in said wireless ad-hoc network;
controlling said internal hardware firewall to:
provide access by said host device to said one or more data packets stored in said memory, and
prevent access to said one or more other data packets stored in said memory,
wherein said memory includes a register mailbox and a packet buffer which has a plurality of addresses,
said method further comprising providing a common set of registers to said host device and said controller.

9. A method as claimed in claim 8, further comprising:
controlling a modem to modulate an outgoing signal into an analog format, and to demodulate an incoming signal into a digital format packet; and
directing one or more modem control functions to demodulate an incoming signal into a digital format packet.

10. A method as claimed in claim 8, further comprising:
retrieving a completion reply from said host device and in response, to configure said internal hardware firewall to prohibit said host device to access said register mailbox and said packet buffer.

11. A method as claimed in claim 9, further comprising:
controlling routing functions to transfer a digital format packet from said modem to an address range of said packet buffer.

12. A method as claimed in claim 9, further comprising:
determining if said host device requires access to said incoming signal digital format packet and in response, to configure said internal hardware firewall to allow said host device access to said register mailbox via a host interface.

13. A method as claimed in claim 9, further comprising:
determining an address range in said packet buffer which contains said digital format packet and to place a message containing said address range in said register mailbox, and to signal said host device to access said register mailbox to retrieve said message.

14. A method as claimed in claim 11, further comprising:
configuring said internal hardware firewall to allow said host device to access said address range of said packet buffer.

15. A computer-readable medium of instructions for managing access to data stored within a node in a wireless ad-hoc communications network, wherein said node comprises a host device and a routing device, wherein said routing device includes a memory, an internal hardware firewall, and a controller, said computer-readable medium of instructions comprising:
a first set of instructions, adapted to control an internal hardware firewall at said node to provide access by said host device to a portion of said memory containing one or more data packets intended for said node, and to prevent access to an other portion of said memory containing one or more other data intended for one or more other nodes in said wireless ad-hoc network; and
a second set of instructions, adapted to control a router device central processing unit (CPU) to configure said internal hardware firewall to provide or prevent said access, wherein:
said second set of instructions is adapted to control said memory, including a register mailbox and a packet buffer which has a plurality of addresses, to provide a common set of registers to said host device and said controller.

16. A computer-readable medium of instructions as claimed in claim 15, wherein:
said second set of instructions is adapted to control a modem to modulate an outgoing signal into an analog format, and to demodulate an incoming signal into a digital format packet; and
wherein said second set of instructions is further adapted to direct modem control functions to demodulate an incoming signal into a digital format packet.

17. A computer-readable medium of instructions as claimed in claim 15, wherein:
said second set of instructions is adapted to retrieve a completion reply from said host device and in response, to configure said internal hardware firewall to prohibit said host device to access said register mailbox and said packet buffer.

18. A computer-readable medium of instructions as claimed in claim 16, wherein:
said second set of instructions is adapted to direct routing functions to transfer a digital format packet from said modem to an address range of said packet buffer.

19. A computer-readable medium of instructions as claimed in claim 16, wherein:
said second set of instructions is adapted to determine if said host device requires access to said incoming signal digital format packet and in response, to configure said internal hardware firewall to allow said host device access to said register mailbox via a host interface.

20. A computer-readable medium of instructions as claimed in claim 16, wherein:
said second set of instructions is adapted to determine an address range in said packet buffer which contains said digital format packet and to place a message containing said address range in said register mailbox, and to signal said host device to access said register mailbox to retrieve said message.

21. A computer-readable medium of instructions as claimed in claim 18, wherein:
said second set of instructions is adapted to configure said internal hardware firewall to allow said host device to access said address range of said packet buffer.

* * * * *